US011442958B2

(12) United States Patent
Savir et al.

(10) Patent No.: US 11,442,958 B2
(45) Date of Patent: Sep. 13, 2022

(54) DATA DISTRIBUTION IN CONTINUOUS REPLICATION SYSTEMS

(71) Applicant: EMC IP Holding Company LLC, Hopkinton, MA (US)

(72) Inventors: Amihai Savir, Sansana (IL); Assaf Natanzon, Tel Aviv (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 196 days.

(21) Appl. No.: 16/395,035

(22) Filed: Apr. 25, 2019

(65) Prior Publication Data

US 2020/0342000 A1 Oct. 29, 2020

(51) Int. Cl.
*G06F 16/27* (2019.01)

(52) U.S. Cl.
CPC .................................. *G06F 16/27* (2019.01)

(58) Field of Classification Search
CPC ........................................................ G06F 16/27
See application file for complete search history.

(56) References Cited

U.S. PATENT DOCUMENTS

| | | | |
|---|---|---|---|
| 6,823,336 B1 * | 11/2004 | Srinivasan | G06F 3/0611 |
| 7,840,536 B1 * | 11/2010 | Ahal | G06F 16/1815 |
| | | | 707/648 |
| 7,844,856 B1 | 11/2010 | Ahal et al. | |
| 8,335,771 B1 * | 12/2012 | Natanzon | G06F 11/2074 |
| | | | 707/684 |
| 9,275,063 B1 * | 3/2016 | Natanzon | G06F 3/065 |
| 9,477,661 B1 * | 10/2016 | Chamness | G06F 16/217 |
| 2010/0191884 A1 * | 7/2010 | Holenstein | G06F 11/2094 |
| | | | 710/200 |
| 2014/0258223 A1 * | 9/2014 | Cao Minh | G06F 16/27 |
| | | | 707/610 |
| 2015/0278331 A1 * | 10/2015 | Blea | G06F 11/1448 |
| | | | 707/610 |
| 2016/0210341 A1 * | 7/2016 | Zhuang | G06F 16/27 |
| 2018/0253483 A1 * | 9/2018 | Lee | G06F 16/2358 |
| 2020/0034718 A1 * | 1/2020 | Beedu | G06F 16/27 |
| 2020/0118039 A1 * | 4/2020 | Kocberber | G06N 20/00 |

FOREIGN PATENT DOCUMENTS

WO 2011/128922 10/2011

OTHER PUBLICATIONS

PCT/US2019/067125, May 29, 2020, International Search Report and Written Opinion.

* cited by examiner

*Primary Examiner* — Jay A Morrison
(74) *Attorney, Agent, or Firm* — Workman Nydegger

(57) ABSTRACT

Systems and methods for performing data protection operations including replication operations. A replication operation may automatically learn and predict when a replication system will need to switch modes, such as to a protective mode or to a fast-forward mode. The replication operation ensures that the data is replicated in a manner that optimizes the ability to retain data needed to perform point in time recovery operations while prioritizing the replication operation of new data.

20 Claims, 4 Drawing Sheets

DATA DISTRIBUTION IN CONTINUOUS REPLICATION SYSTEMS

FIELD OF THE INVENTION

Embodiments of the invention relate to systems, methods, and apparatus for protecting data. More particularly, embodiments of the invention relate to data protection operations including backup operations, restore operations, data distribution operations and replication operations. More specifically, embodiments of the invention relate to optimizing data distribution models in replication systems including continuous replication systems.

BACKGROUND

In many computing systems, data may be replicated from a source system or site to a target system or site. Replication is essentially the process of storing the same data at more than one location or at more than one node. When data is replicated, all users can share the same data. Alternatively, when data is replicated to a secondary storage from a primary storage, the secondary storage can immediately take the place of the primary storage if the primary storage experiences a problem such as failure.

However, the amount of data that is replicated in replication systems can place a burden on the system to which the data is replicated. This is particularly true when the target system attempts to maintain the ability to undo some of the operations and return to a previous point in time.

More specifically, there are burdens associated with replicating the data at the target site while ensuring that the replicated can still provide point-in-time (PIT) restore capabilities. One of the burdens is the fact that it is often necessary to sacrifice the data needed to undo some of the replication actions in order to ensure that the data is replicated successfully. As a result, PIT restore capabilities may be lost.

BRIEF DESCRIPTION OF THE DRAWINGS

In order to describe the manner in which at least some of the advantages and features of the invention can be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Embodiments of the present invention generally relate to data protection and to systems, methods, and apparatus for performing data protection operations. Examples of data protection operations include, but are not limited to, backup operations, restore operations, replication operations, data distribution operations, point in time recovery operations, or the like or combination thereof. More particularly, embodiments of the invention relate to systems, hardware, software, computer-readable media, and methods for performing data protection operations including replication operations.

Embodiments of the invention relate to a data protection system (e.g., DELL EMC Recovery Point) that may perform replication operations. Embodiments of the invention relate to systems, apparatus, and methods that enable continuous replication and that are able to more efficiently handle data and applications that may create intensive workloads. The continuous replication discussed herein enables continuous application and optimizes the ability to perform any point in time recovery operations.

Figure 1:
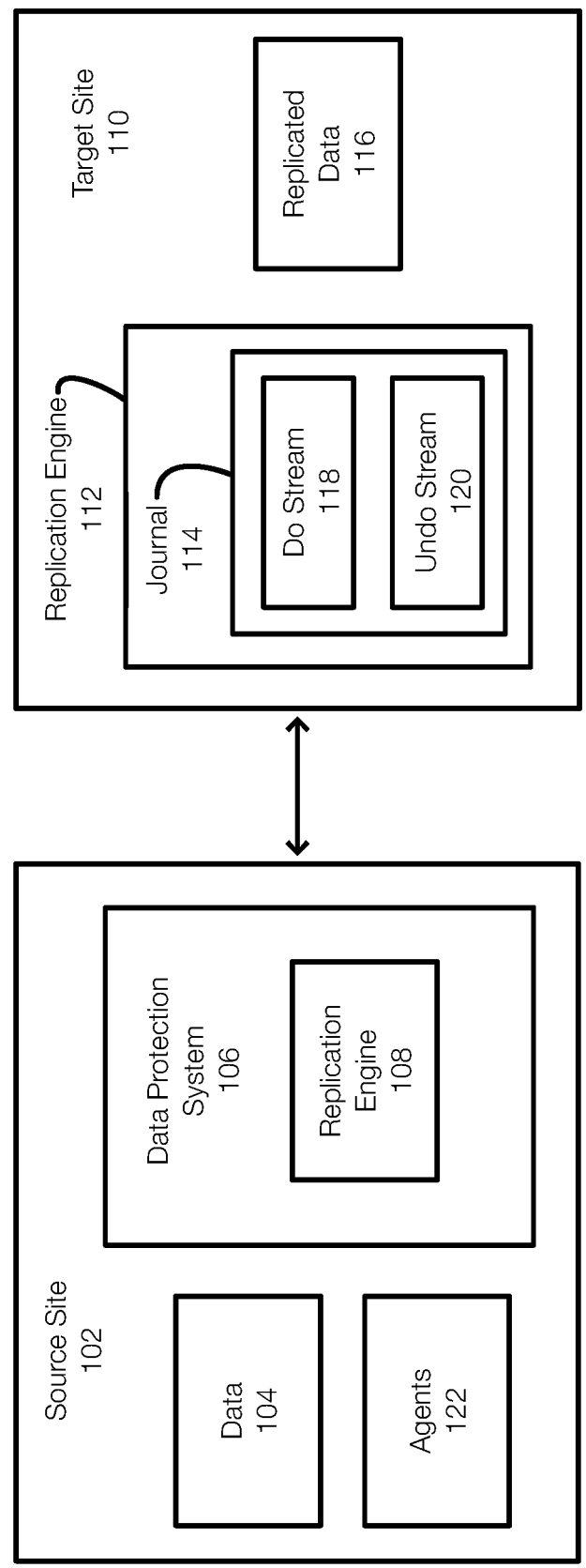
FIG. 1 illustrates and example of a data protection application that replicates data from a source site to a target site.

FIG. 1 illustrates an example of an environment in which data operations such as replication operations and/or point in time recovery operations may be performed. FIG. 1 illustrates a source site 102 that is associated with data 104. The data 104 is representative of different types of data that may be replicated. The data 104 may include, for example, database data, files, objects, virtual machines, or the like.

The data 104 is typically replicated to a target site 110 and stored as replicated data 116. Thus, the replicated data 116 is the same as the data 104. For example, if the data 104 is a set of virtual machines pertaining to one or more applications, the replicated data 116 is a copy of these virtual machines.

When changes to the data 104 are made, these changes or writes are also performed on the replicated data 116. Although there may be a delay, the replicated data 116 is substantially equivalent to the data 104 in real time and is an example of near real time replication.

The data 104 may be replicated by a data protection system 106. The data protection system 106 may include a replication engine 108 that may coordinate with a replication engine 112 operating at the target site 110.

In one example, the replication engine 108 may be positioned to intercept or otherwise identify writes that occur to the data 104. These writes are then transmitted to the replication engine 112 at the target site 110. The writes are then applied to the replicated data 116. Thus, the writes (or other operations such as deletes, moves, etc.) performed on the data 104 are performed on the replicated data 116.

The replication at the target site 110 is achieved using a journal 114 that may include a do stream 118 and an undo stream 120. Typically, the journal 114 is a representation of memory used in the replication process. In one example, the do stream 118 and the undo stream 120 share the same memory. In one example, the size of the journal 114 may not be unlimited even if very large. The undo stream 120 contains data that allows for point in time recovery. If the undo stream 120 is lost, then the ability to perform point in time recovery is also lost. However, priority is typically given to the replication aspect. In order to ensure that replication is performed, the ability to perform point in time recovery operations may be compromised. Embodiments of the invention prevent or minimize the extent to which the ability to perform point in time recovery operations is compromised. Embodiments of the invention minimize the impact of applications that flush or replicate large amounts of data on the performance and replication of other applications.

In one example, agents 122 may also operate at or on the data 104 (e.g., on virtual machines, on file servers, or the like). The agents 122 may collect information about the data 104 such as bias, level, and seasonality. These factors (or historical factors) can be used to generate a forecast related to replication needs. Embodiments may further consider trends, cycles, irregular variations, random variations, or the like when generating a forecast.

Bias refers, in one example, to differences between actual outcomes and previous outcomes. For example, if a virtual machine is expected to replicate x amount of data but actually generates y amount of data, the difference is an example of a bias. The bias can be used, in one example, to improve subsequent forecasts or models used to generate forecasts.

Seasonality often refers to a cyclic variation that may depend on time of day, day of the week, or on another parameter. In the context of replication, seasonality may reflect certain actions that occur at the source. For example, data may be regularly added to a database. The seasonality of the addition may be used to predict when the target site may experience an increase in the replication load.

Level may refer to the amount of data. These three components can be used in time series equations to generate forecasts or predictions. These predictions or forecasts can be used by the replication engine to manage the replication process at the target site.

The historical data can be combined with the current status of the journal and or the do/undo streams. For example, if the forecast predicts that a large amount of data is expected at the target site and that the amount of free memory in the journal is low, the replication engine may take action or change the replication process. This is an example of switching modes.

Generally, replication may operate in a normal mode (e.g., a 5-phase mode described below). This is a mode that performs replication and that preserves old data to enable PIT recovery. Another mode is protective mode. In the protective mode, some aspects or phases of replication are not performed while still preserving the old data in the UNDO stream. For example, new data may not be written to the target storage such that the journal is not burdened with the old data being replaced. This conserves resources without sacrificing the PIT recovery ability. More specifically, this may preserve PIT recovery ability for some period of time. If there is enough memory to accommodate the new data coming in, the normal mode can be resumed at a later time.

If necessary, fast forward (FF) mode may be entered. In FF mode, the undo data may be sacrificed in order to ensure that the replication aspect is still successful. In this case, incoming new data may overwrite data in the UNDO stream. In this case, at least some of the PIT recovery may be lost. However, the UNDO data can be selectively replaced (e.g., sacrifice the oldest data in the undo stream first) in some embodiments.

Figure 2:
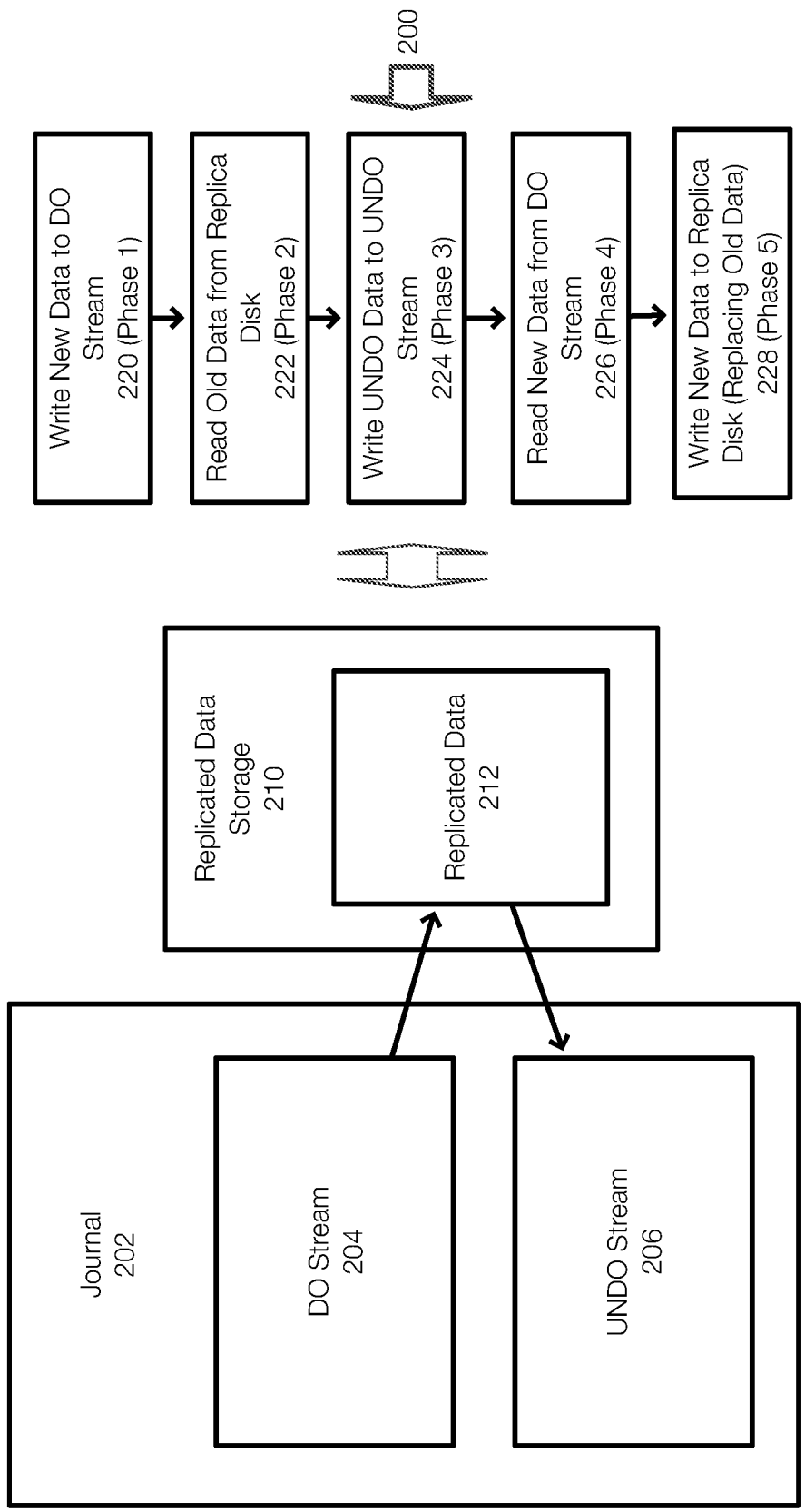
FIG. 2 illustrates an example of a journal that may be used during replication at the target site and illustrates a method for replicating data.

FIG. 2 illustrates an example of performing replication at the target site and is used to illustrate modes of the replication operation at the target site. In this example, the journal 202 includes a DO stream 204 and an UNDO stream 206. As previously stated, the journal 202 may be a memory and the DO stream 204 represents the part of the journal storing new data to be written to the replicated data storage 210 and the UNDO stream 206 represents and contains old data from the replicated data 212 that has been previously overwritten by new incoming data. Thus, the DO stream 204 contains data that has been written (or changed, deleted, moved) at the source site. Thus, the journal 202 may receive data into the DO stream 204 (or into this portion of memory). In effect, the DO stream 204 is a buffer for incoming data. As data from the DO stream 204 is transferred to the replicated data 212 on the replicated data storage 210, the data being replaced or changed by the new data is stored in the UNDO stream 206.

The movement of data to/from the replicated data 212 is described in the method 200, which describes 5 phases (Phases 1-5) of normal replication.

More specifically, new data or incoming 10 (e.g., disk x, offset y) is written to the DO stream 220 in phase 1, for example by a replication engine. Next, old data is read from the replica disk 222 (e.g., the replicated data storage 210) in phase 2. More specifically, the data present at disk x, offset y is read 222 in phase 2 and then written 224 to the UNDO stream 206 as UNDO data in phase 3. The UNDO data may include the old data as well as metadata that allows point in time recovery operations to be performed.

Once the UNDO data is written 224 to the UNDO Stream 206 in phase 3, the new data previously written to the DO stream 204 is read 226 from the DO stream in phase 4 and then written 228 to the replica disk 228 or to the replicated data storage 210 in this example in phase 5. Thus, the new data received into the DO stream and subsequently stored in the replicated data 212 replaces the old data that was read and preserved in the UNDO stream 206.

In effect, the UNDO stream 206 saves a history of the replicated data 212 and keeps track of the data that is being overwritten by new data. The UNDO stream 206 thus allows PIT recovery if desired or necessary. Typically, the PIT in time is limited to a certain amount of time at least due to memory constraints. Thus, the data in the UNDO stream 206 may expire and may be removed over time.

In this example, steps 222, 224, 226 and 228 (or phases 2-4) may be performed asynchronously such that incoming 10 streams are not blocked. Once a chunk of data has been read from the DO stream 204, the space in the DO stream 204 (or memory) is marked as free such that the space can be used for future IOs. In addition, metadata is saved in the journal 202, as previously stated, such that access to a disk state as specific points in time can be generated. In one example, the data in the journal 202 may be handled in blocks at specific sizes.

The method 200 ensures that the data protection system can provide any point in time capability for the 10 written to the replicated data storage 210. For example, these steps ensure that point in time restores can be generated because old data at disk x, offset y, that was overwritten by the new data, is preserved in the UNDO stream 206. In one example, data in the UNDO stream 206 may be allowed to expire as previously stated.

When the workload of the data protection system is high, the continuous replication operation may switch to fast-forward (FF) replication mode. The FF mode requires fewer resources at the expense of the data in the UNDO stream. More specifically, when FF replication is initiated, steps 222 and 224 or phases 2-3 are not performed. Thus, the undo data is not retained but is simply overwritten when operating in FF mode. One of the consequences is that previous entries in the UNDO stream 206 become invalid and the entire history may be discarded.

The protection or protective mode may prevent the history or the UNDO stream 206 from being discarded where possible or minimize the extent to which the history is lost when FF replication mode is required. In one example, in the protective mode, only phase 1 is performed. Thus, the new data is allowed to fill the journal. The forecast may indicate for example, that the protective mode will allow all of the incoming new data to be stored successfully in the DO stream 204. At a later time (e.g., when the forecast indicates that the workload is decreasing), the replication operation may again enter normal mode. As a result, the UNDO data was preserved.

Embodiments of the invention also ensure that redundant or unnecessary operations are not performed. For example, embodiments of the invention automatically learn and predict that the system may need to move to FF mode using time series models and machine learning methods. In such cases, instead of continuing performing replication as illustrated in the method 200 (performing phases 1-5), the system will stop data distribution (e.g., only perform phase 1), and then fast forward distribution will start only if necessary. This significantly reduces the load on the target storage 210 and allows the system to run much more efficiently.

In one example, when it is determined that the DO stream may consume the journal 202 in the future (e.g., in some time period based on usage or based on the forecast), the system may automatically stop phases 2-5 of the distribution and only perform phase 1. This prevents the data in the replicated data storage 210 from simply being overwritten while, at the same time preventing redundant IOs associated with phases 3-4 (e.g., writing data to the UNDO stream 206 that is lost because of the FF mode that may be subsequently entered). In this example, FF mode need not be entered unless it is clear that the DO stream will overcome (fill) the journal 202. Thus, instead of simply entering FF mode and losing the UNDO stream 206, embodiments of the invention allow for the DO stream 204 to be prioritized without sacrificing the UNDO stream 206 or at least while protecting the UNDO stream 206 for some time.

In other words, embodiments of the invention can avoid redundant writes in situations where performing all phases of replication may result in unnecessary actions. Further, by avoiding redundant writes to the UNDO stream 206, the resources that would have been used for the redundant writes (memory, processing resources, network traffic, storage IOPs and throughput), can be used by other applications and may prevent the other applications from entering FF mode, thereby conserving the journal. Further, eliminating redundant writes may positively impact the life of memory such as flash memory, whose life is often defined in terms of writes.

Embodiments of the invention thus enter FF mode or protective mode based on, by way of example, machine learning and prediction methods. The forecast of anticipated load (amount, rate, etc.) can be combined with the current state of the journal to determine whether to switch modes. This forecast can be combined with threshold levels. For example, the mode is switched with a threshold is satisfied.

Figure 3:
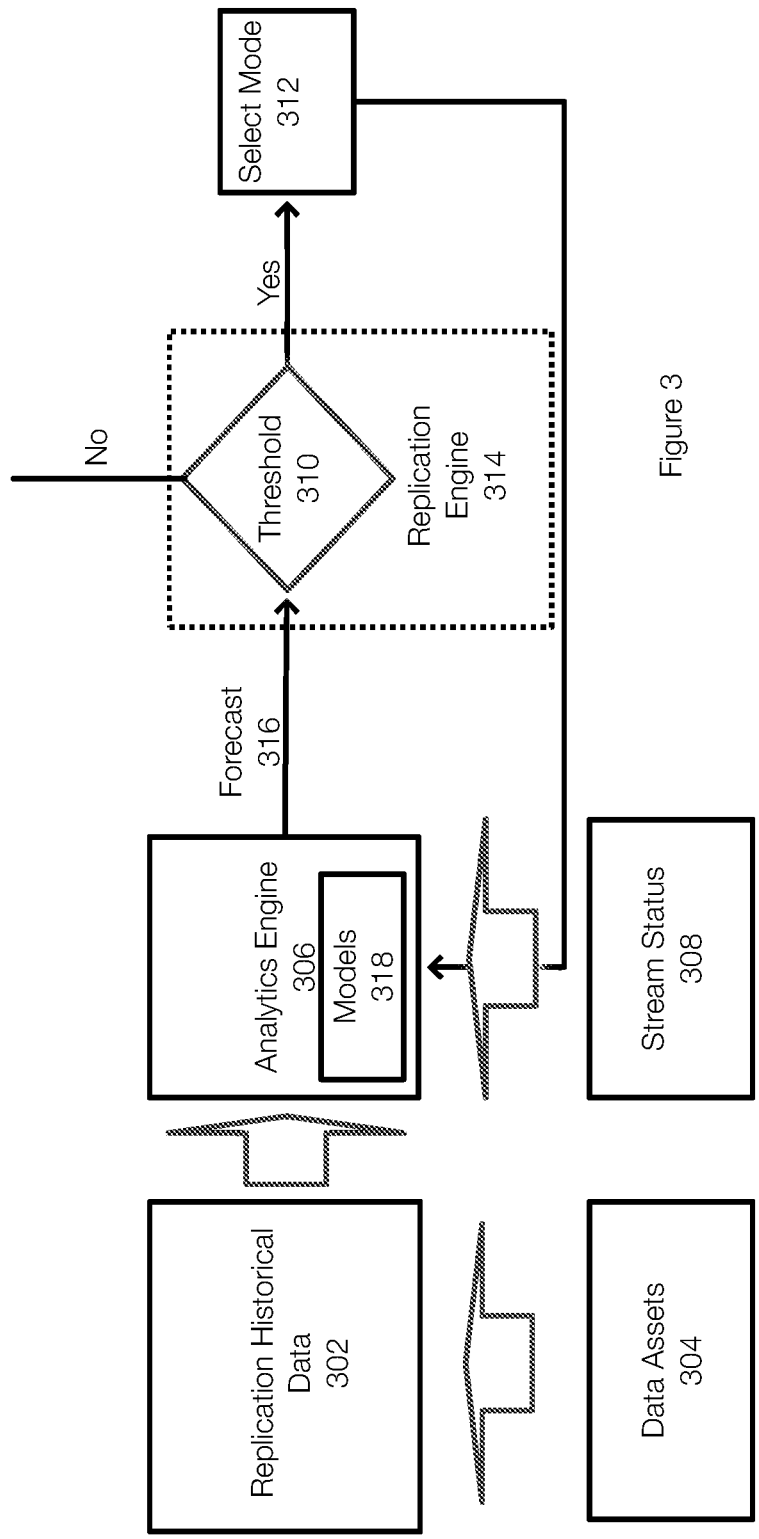
FIG. 3 illustrates an example an example architecture for replicating data while minimizing data loss.

FIG. 3 illustrates an example of a data protection system that incorporates data collection, machine learning, and/or analytics to determine how to handle the journal or how to handle the replication operation. In one example, the replication operation or the data protection system may provide a bucket of models that can be used to evaluate the historical data of the assets being replicated. These models can be used on individual assets or on the assets as a whole.

Thus, each asset, each group of assets, or the assets as a whole may each reflect the factors (seasonality, level, bias, trends, etc.) used by the models. The historical data is thus stored, updated, and evaluated in an ongoing manner such that the forecasts can be updated or changed based on actual and/or past activities. The forecast may identify a surge of data from a particular application or asset, a surge in data from a group or from all assets as a whole. The forecast may identify how long the surge is anticipated to last. The forecast can identify idle periods and the like.

Further, some events may be handled differently. For example, a new asset such as a virtual machine may have a surge of data when new. However, there is no old data to protect. Thus, the replication engine may understand this aspect and not worry about phases related to the UNDO stream.

Replication may be used in terms or with backup systems as well. Thus, as backups are created, they may be created in accordance with a cycle. These surges can be forecast. In addition, the size of the anticipated data can also be forecast. Over time, machine learning can be used to adjust the model based on actual data amount, actual transfer times, or the like. Further, the forecast can adapt to current activities on the source site.

As a result, the determination of when to enter FF mode (or another mode) may be performed by an analytics engine 306. The analytics engine 306 may have access to replication historical data 302, a stream status 308, and may include a bucket of models that can be applied to the historical data 302 and/or the stream status 308 to determine the health or status of the journal or, more specifically, of the DO stream and the UNDO stream. The replication engine 314 may switch modes based on a forecast 316 generated by the analytics engine 306.

Embodiments of the invention allow the replication operation to be managed in real time or near real time using the replication historical database 302, which is an example of a data collection mechanism that may collect, store and update information or metadata related to the data assets 304. The analytics engine 306 may include models 318 that can be applied to historical data points for forecasting purposes, model competition, and the like. The replication engine 314 may include a threshold 310 that can be used when determining whether to switch modes. These thresholds 310 can be used to determine whether to pause data distribution based on the journal, the incoming streams, and/or the historical data. The thresholds 310 may also determine when to enter FF mode, protective mode and/or resume normal mode. This allows the efficiency of the replication operation to be improved.

For example, many storage and protection assets send daily state updates to their manufacturers (ASUP data\ SYR data etc.). In other cases, data collecting agents are deployed for collecting data from those assets (e.g., DPA agents). The collected data contain relevant information about the usage and utilization of the assets. The data collected by the agents from the data assets 304 can be stored as historical data 302. The replication historical data 302 may be stored centrally and used by the data protection system. The data may be parsed as well for analysis.

For example, when the data assets 304 are virtual machines, some of the data collected by the data agents (or acquired in another way) may include an update schedule, IOPs, write frequency, how often data is added, data growth rates, or the like. When the data is analyzed, the historical data 302 may represent that data is added in bulk at regular intervals or may indicate other trends, seasonality, bias, levels, etc., associated with the data assets 304. This type of information allows the replication operation to anticipate the type of load that may be generated at the replication target site when the data is replicated and may factor into the decision of whether to enter FF mode, protective mode, or normal mode.

More specifically, the analytics engine 306 is configured to receive or analyze information such as the replication historical data 302 and the stream status 308. The analytics engine 306 then generates a forecast 316 that is used by the replication engine 314 when determining the mode to enter.

The analytics engine 306 can predict the status of each data asset (e.g., each virtual machine in an environment where the virtual machines are replicated) across time. Further, the analytics engine 306 can also predict the stats of the total environment at least in terms of utilization across time.

The analytics engine 306 may discover trends and seasonality patterns in the usage of different assets. The analytics engine 306 takes into account the historical data 302 of each asset separately as well as the historical data of the environment as a whole. The prediction of utilization (numeric) can be done by using time series models as well as linear regression models. The models may be fitted to a given train dataset, then validated and evaluated on a given test dataset. Different time-series can relate to different forecasting models.

The analytics engine 306 may provide or include a bucket of models 318 such that a model that best describes the data (e.g., by minimizing the error function outcome) can be found. Various models may be evaluated, and the best performing model may be selected for any given prediction task. This improves overall accuracy compared to the use of any single model type.

To track the behavior of the replication data size across time over different protected applications, time series (TS) models may be used. Any time series model can be selected (e.g., Regression Model, ARIMA, or neural networks). In one example, a Holt-Winters model is used because of its simplicity and ease of updating the model in an online manner. This model fundamentally tracks three components of the signal: Level, Bias and Seasonality. Generally, the model may use the following time-series equations:

| LEVEL | $L_t = \gamma(Y_t - S_{t-s}) + (1 - \gamma)(L_{t-1} + B_{t-1})$ | (1) |
|---|---|---|
| BIAS | $B_t = \beta(L_t - L_{t-1}) + (1 - \beta)B_{t-1}$ | (2) |
| SEASONALITY | $S_t = \gamma (Y_t - L_t) + (1 - \gamma)S_{t-s}$ | (3) |
| FORECAST | $F_{t+k} = L_t + kB_t + S_{t+k-s}$ | (4) | where $Y_t$ is the actual value at time t and s is the length of the seasonal cycle. For a detailed description and analysis of the above equations please refer to "The Analysis of Time Series: An Introduction", 6th Edition, Chris Chatfield, CRC Press, 19 Nov. 2013.

This model (and other models) can predict the utilization of the journal and predict the impact of the utilization. For example, the model may predict that the DO stream will consume the entire journal. In this case, the replication engine may enter FF mode or protective mode. Alternatively, the system may stop the distribution until the DO stream is full by entering protective mode and then enter FF mode only if necessary and based on the forecast, which may be continually or repeatedly updated.

The prediction may be based on predicted storage performance, historical data, and on predicted of activity of incoming write to the journal.

The replication engine 314 may determine when to perform a mode switch based on a threshold 310. If a mode switch is performed, the mode is selected 312 and the process continues. If no mode switch is performed, the process still continues.

The analytics engine 306 may generate the forecast 316, which may include confidence intervals, and have access to the stream status 308 (e.g., storage remaining in journal or free capacity, storage used by DO stream, storage used by UNDO stream). This information may be provided to the replication engine 314 that can then determine if there is a need to switch modes.

Thus, the determination to switch modes 310 may be based on a threshold value. For example, the forecast 316 may indicate that the DO stream will be full in a certain period of time (e.g., 2 hours). This forecast 316 may be based on a surge of data that is expected to occur or that is unexpected. The forecast 316 may also identify a potential amount of data, how long the surge will last, and the like. If the free capacity of the journal is below a threshold, the replication engine 314 may stop data distribution and enter protective mode. This effectively allows, in one embodiment, some of the journal to be used for the DO stream instead of for the UNDO stream. If the free capacity reaches another threshold, FF mode may be entered when it is evident that the DO stream will be overcome. The thresholds can be set differently for different applications. Examples of other thresholds may include a minimum confidence level for switching to FF mode, flush minimum size, or the like.

As previously described, embodiments of the invention can evaluate the journal activity and the source activity, the historical source activity, and predict that the DO stream of the journal will become full. Distribution is paused, in one example, until the journal is full. At this stage (or at a threshold value) another distribution method may begin (such as FF mode or protective mode). In one example, none of the journal is lost, for example, in protective mode. Further, the decision can be re-evaluated as the forecast 316 changes while the distribution is paused (e.g., while only performing phase 1).

Figure 4:
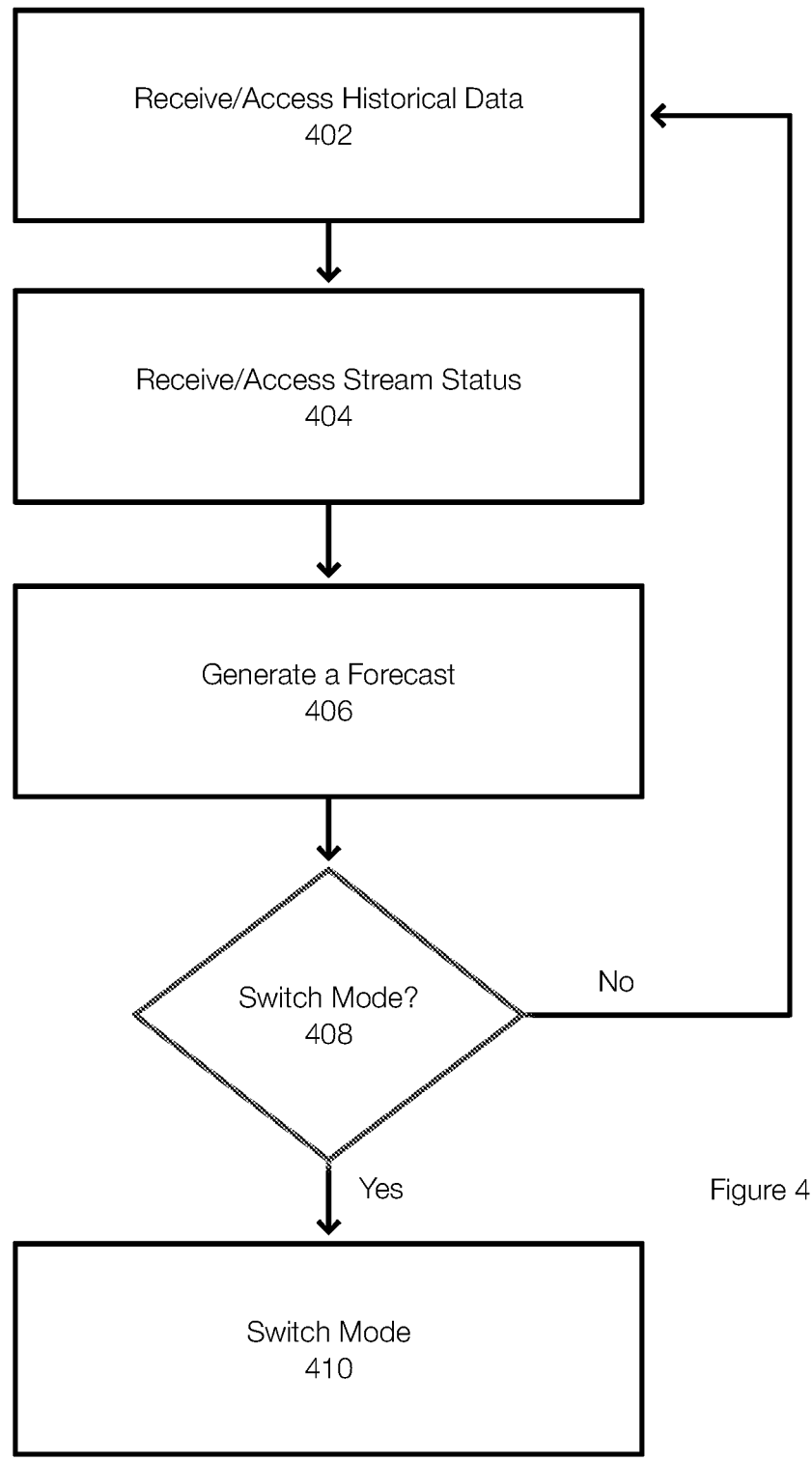
FIG. 4 is a flow diagram for replicating data at a target site.

FIG. 4 illustrates and example of a method for replicating data. In the method of FIG. 4, historical data is accessed or received 402. The historical data, as previously described, is collected from data assets and can be processed or analyzed to identify attributes or factors of the data asset such as bias, level, seasonality, trends, or the like or combination thereof. Further, the historical data may also include real-time or near-real time data about the data assets regarding the factors. For example, a data surge may occur unexpectedly, and this information may be received by an analytics engine.

The stream status is also received or accessed 404 by an analytics engine of a data protection system. The stream status may include, but is not limited to, memory size, size of DO stream, size of UNDO stream, free memory, current data rate of writes into the stream from one or more applications, usage rate, whether free memory is increasing or decreasing, or the like.

With this information the analytics engine may generate 406 a forecast. In one example, the analytics engine may only use the state of the journal when applying the forecast. The forecast may include information about expected data transfers (e.g., size), time to complete the transfer, or information that may be used when selecting or determining a mode of operation. The replication engine may take the forecast and apply the forecast to the current state of the journal. This allows the replication engine to determine whether the memory will be consumed by the current 10 stream and estimate when this will occur.

Using, in one example, a threshold, the replication engine determines whether to switch 408 modes. If no, the process repeats and the determination of whether to switch modes is repeated in accordance with new or updated forecasts. If yes, the mode is switched 410. The mode to which the replication system is switched, however, may vary. For example, if the memory is expected to be consumed in a first threshold (e.g., 1 hour), the system may switch to FF mode. If the memory is expected to be consumed in a second threshold (e.g., 2 hours), the system may switch to protective mode and then evaluate subsequent forecasts to see if the forecasts change. This allows the UNDO stream to be protected in an optimized manner. Other thresholds may be used when switching modes. Further, applications or data assets may be considered individually. If a data asset is experiencing a large surge, this surge may still be small from the perspective of the entire system. As a result, switching to FF mode may not be necessary as a surge from a single application may not impact the journal like a surge from the system as a whole.

Further, as actual measurements are measured and compared to historical data, models can be updated using this type of machine learning.

The following is a discussion of aspects of example operating environments for various embodiments of the invention. This discussion is not intended to limit the scope of the invention, or the applicability of the embodiments, in any way.

This disclosure is not limited to replicate applications running on virtual machines, which RP4VMs protects, but can also relate to other runtime environments such as physical servers, containers, or the like or combination thereof.

In general, embodiments of the invention may be implemented in connection with systems, software, and components, that individually and/or collectively implement, and/or cause the implementation of, data management operations. Such data management operations may include, but are not limited to, data read/write/delete operations, data backup operations, data restore operations, data cloning operations, data archiving operations, and disaster recovery operations. Thus, while the discussion herein may, in some respects, be directed to a discussion of data protection environments and operations, the scope of the invention is not so limited. More generally then, the scope of the invention embraces any operating environment in which the disclosed concepts may be useful. By way of illustration, but not limitation, embodiments of the invention may be employed in connection with data backup and restore platforms such as the Dell-EMC NetWorker and Avamar and Data Domain platforms.

A data protection environment may take the form of a public or private cloud storage environment, an on-premises storage environment, and hybrid storage environments that include public and private elements, although the scope of the invention extends to any other type of data protection environment as well. Any of these example storage environments, may be partly, or completely, virtualized. The storage environment may comprise, or consist of, a datacenter which is operable to service read and write operations initiated by one or more clients.

In addition to the storage environment, the operating environment may also include one or more host devices, such as clients for example, that each host one or more applications. As such, a particular client may employ, or otherwise be associated with, one or more instances of each of one or more applications. In general, the applications employed by the clients are not limited to any particular functionality or type of functionality. Some example applications and data include email applications such as MS Exchange, filesystems, as well as databases such as Oracle databases, and SQL Server databases, for example. The applications on the clients may generate new and/or modified data that is desired to be protected.

Any of the devices or entities disclosed herein may be protected by one or more data protection policies according to various embodiments of the invention. Yet other examples of devices that may be protected by way of a data protection policy according to embodiments of the invention include, but are not limited to, containers, and VMs.

Any of the devices, including the clients, servers and hosts, in the operating environment can take the form of software, physical machines, or virtual machines (VM), or any combination of these, though no particular device implementation or configuration is required for any embodiment. Similarly, data protection system components such as databases, storage servers, storage volumes (LUNs), storage disks, replication services, backup servers, restore servers, backup clients, and restore clients, for example, can likewise take the form of software, physical machines or virtual machines (VM), though no particular component implementation is required for any embodiment. Where VMs are employed, a hypervisor or other virtual machine monitor (VMM) can be employed to create and control the VMs.

As used herein, the term 'data' is intended to be broad in scope. Thus, that term embraces, by way of example and not limitation, data segments such as may be produced by data stream segmentation processes, data chunks, data blocks, atomic data, emails, objects of any type, files, contacts, directories, sub-directories, volumes, containers, and any group of one or more of the foregoing.

Example embodiments of the invention are applicable to any system capable of storing and handling various types of objects, in analog, digital, or other form. Although terms such as document, file, block, or object may be used by way of example, the principles of the disclosure are not limited to any particular form of representing and storing data or other information. Rather, such principles are equally applicable to any object capable of representing information.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein.

As indicated above, embodiments within the scope of the present invention also include computer storage media, which are physical media for carrying or having computer-executable instructions or data structures stored thereon. Such computer storage media can be any available physical media that can be accessed by a general purpose or special purpose computer.

By way of example, and not limitation, such computer storage media can comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which can be used to store program code in the form of computer-executable instructions or data structures, which can be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' can refer to software objects or routines that execute on the computing system. The different components, modules, engines, and services described herein may be implemented as objects or processes that execute on the computing system, for example, as separate threads. While the system and methods described herein can be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention can be performed in client-server environments, whether network or local environments, or in any other suitable environment. Suitable operating environments for at least some embodiments of the invention include cloud computing environments where one or more of a client, server, or other machine may reside and operate in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a computing system that replicates data assets at a source site to a target site, a method for replicating the data assets in a replication operation, the method comprising:
accessing historical data about the data assets at the source site that are being replicated;
generating a forecast for replication needs of the source site based on the historical data associated with the data assets at the source site;
switching a mode of the replication operation at the target site in accordance with the forecast and a state of a journal at the target site, wherein the journal includes memory including a free portion and a used portion, wherein the memory is used for replicating the data assets at the target site, wherein the forecast is used to determine whether the free portion is sufficient to accommodate the forecasted replication needs of the source site and wherein the mode is switched based on whether the journal can accommodate the forecasted replication needs; and
replicating the data assets at the target site according to the mode.

2. The method of claim 1, further comprising collecting historical data from the data assets at the source site.

3. The method of claim 1, wherein the mode is a normal mode, a protective mode, or a fast-forward mode.

4. The method of claim 3, further comprising switching the mode to another mode based on the forecast.

5. The method of claim 1, wherein entering a mode includes switching to another mode when the forecast crosses a threshold, wherein the threshold is an amount of the free portion in the memory.

6. The method of claim 1, wherein the historical data includes at least one of a seasonality, a bias, and a level for each of the data assets individually and for the data assets as a whole.

7. The method of claim 6, further comprising updating the forecast and determining whether to switch to a different mode.

8. The method of claim 3, further comprising:
storing new data in a do stream portion of the journal and storing old data in an undo stream portion of the journal.

9. The method of claim 8, further comprising expiring data in the undo stream.

10. The method of claim 8, further comprising switching to a protective mode, wherein data distribution from the DO stream to a replica storage is suspended in the protective mode and data in the undo stream is preserved.

11. The method of claim 10, further comprising switching to the fast-forward mode when the do stream is expected to fill the journal.

12. The method of claim 10, further comprising switching to the normal mode when the forecast allows.

13. A non-transitory computer readable medium comprising computer executable instructions that, when executed, perform a method for replicating data assets from a source site to a target site during a replication operation, the method comprising:
accessing historical data about the data assets at the source site that are being replicated;
generating a forecast for replication needs of the source site based on the historical data associated with the data assets at the source site;
switching a mode of the replication operation at the target site in accordance with the forecast and a state of a journal at the target site, wherein the journal includes memory including a free portion and a used portion, wherein the memory is used for replicating the data assets at the target site, wherein the forecast is used to determine whether the free portion is sufficient to accommodate the forecasted replication needs of the source site and wherein the mode is switched based on whether the journal can accommodate the forecasted replication needs; and
replicating the data assets at the target site according to the mode.

14. The non-transitory computer readable medium of claim 13, further comprising collecting historical data from the data assets at the source site, wherein the mode is a normal mode, a protective mode, or a fast-forward mode.

15. The non-transitory computer readable medium of claim 14, further comprising switching the mode to one of the normal mode, the protective mode, or the fast-forward mode based on the forecast, wherein the mode is switched based on a relationship of the forecast to a threshold, wherein the threshold relates to an amount of the free portion of the memory.

16. The non-transitory computer readable medium of claim 14, wherein the historical data includes at least one of a seasonality, a bias, and a level for each of the data assets individually and for the data assets as a whole.

17. The non-transitory computer readable medium of claim 14, further comprising updating the forecast and determining whether to switch to a different mode.

18. The non-transitory computer readable medium of claim 14, further comprising:
storing new data in a do stream portion of the journal and storing old data in an undo stream portion of the journal.

19. The non-transitory computer readable medium of claim 18, further comprising switching to the protective mode, wherein data distribution from the DO stream to a replica storage is suspended in the protective mode and data in the undo stream is preserved.

20. The non-transitory computer readable medium of claim 14, further comprising switching to the fast forward mode when the do stream is expected to fill the journal or switching to a normal mode when the forecast allows.

* * * * *